US010320467B2

(12) United States Patent
Elwell et al.

(10) Patent No.: US 10,320,467 B2
(45) Date of Patent: Jun. 11, 2019

(54) FREQUENCY-BASED RADIO BEAMFORMING WAVEFORM TRANSMISSION

(71) Applicant: The United States of America, as represented by the Secretary of the Army, Washington, DC (US)

(72) Inventors: Ryan Elwell, Newfield, NJ (US); Mark Govoni, Abingdon, MD (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 683 days.

(21) Appl. No.: 14/868,506

(22) Filed: Sep. 29, 2015

(65) Prior Publication Data
US 2017/0093034 A1   Mar. 30, 2017

(51) Int. Cl.
H04B 7/08 (2006.01)
H04B 7/06 (2006.01)
H04B 7/12 (2006.01)

(52) U.S. Cl.
CPC ............... *H04B 7/12* (2013.01); *H04B 7/068* (2013.01); *H04B 7/0617* (2013.01)

(58) Field of Classification Search
CPC ......... H04B 7/068; H04B 7/08; G01S 13/106; G01S 13/30; G01S 13/66; G01S 13/758; G01S 13/9035
See application file for complete search history.

(56) References Cited

U.S. PATENT DOCUMENTS

| 4,656,642 | A | 4/1987 | Apostolos et al. |
| 5,909,460 | A | 6/1999 | Dent |
| 6,061,574 | A | 5/2000 | Goldberg |
| 6,219,375 | B1 | 4/2001 | Dent |
| 6,404,821 | B1 | 6/2002 | Dent |
| 7,430,257 | B1 | 9/2008 | Shattil |
| 7,593,449 | B2 | 9/2009 | Shattil |
| 7,684,529 | B2 | 3/2010 | Chimitt |
| 7,737,892 | B2 | 6/2010 | Richardson et al. |
| 7,830,781 | B2 | 11/2010 | Zogg et al. |
| 7,965,761 | B2 | 6/2011 | Shattil |
| 7,979,024 | B2 | 7/2011 | Zheng |
| 8,179,843 | B2 | 5/2012 | Ramanathan et al. |

(Continued)

FOREIGN PATENT DOCUMENTS

ES    2396341 A2 *  2/2013

OTHER PUBLICATIONS

English Translation of ES 2396341 A2 (Year: 2013).*
Dictionary definition for frequency band, Hargrave's Communications Dictionary, Wiley. Hoboken, NJ: Wiley. Retrieved from https://search.credoreference.com/content/entry/hargravecomms/frequency_band/0 (Year: 2001).*

*Primary Examiner* — Bernarr E Gregory
*Assistant Examiner* — Fred H Mull
(74) *Attorney, Agent, or Firm* — Ronald Krosky; Azza Jayaprakash

(57) ABSTRACT

Various embodiments are described that relate to radio beamforming waveform transmission. Transmission can occur, for example, in three manners. The first manner is time-based where waveform transmission is staggered at the same frequency. The second manner is frequency-based where different frequencies are used at one time. This third manner is a combination of time and frequency such that simultaneous transmission occurs, but at different times different frequencies are used.

18 Claims, 13 Drawing Sheets

(56) References Cited

U.S. PATENT DOCUMENTS

| | | |
|---|---|---|
| 8,233,555 B2 | 7/2012 | Naguib et al. |
| 8,427,372 B2 | 4/2013 | Sakai et al. |
| 8,913,672 B2 | 12/2014 | Luo |
| 8,942,742 B2 | 1/2015 | Wetmore |
| 9,014,732 B2 | 4/2015 | Wetmore |
| 9,165,552 B2 | 10/2015 | Oikawa et al. |
| 9,363,784 B1 | 6/2016 | Friday et al. |
| 9,442,188 B2 | 9/2016 | Rector et al. |
| 9,541,638 B2 | 1/2017 | Jansen et al. |
| 9,735,920 B2 | 8/2017 | Luo |
| 2006/0152403 A1* | 7/2006 | Wicks ................. G01S 13/9035 342/25 R |
| 2006/0220956 A1 | 10/2006 | Richardson et al. |
| 2006/0244653 A1* | 11/2006 | Szajnowski ........... G01S 13/106 342/70 |
| 2006/0269023 A1 | 11/2006 | Chimitt et al. |
| 2007/0008213 A1* | 1/2007 | Adams .................... G01S 13/66 342/159 |
| 2008/0131133 A1* | 6/2008 | Blunt .................... G01S 13/758 398/128 |
| 2010/0046421 A1 | 2/2010 | Adams |
| 2011/0064160 A1 | 3/2011 | Haustein et al. |
| 2011/0084880 A1 | 4/2011 | Sakai et al. |
| 2012/0122500 A1 | 5/2012 | Wetmore |
| 2012/0146844 A1 | 6/2012 | Stirling-Gallacher et al. |
| 2012/0154203 A1 | 6/2012 | Vacanti et al. |
| 2012/0218139 A1 | 8/2012 | Suzuki et al. |

\* cited by examiner

FREQUENCY-BASED RADIO BEAMFORMING WAVEFORM TRANSMISSION

GOVERNMENT INTEREST

The innovation described herein may be manufactured, used, imported, sold, and licensed by or for the Government of the United States of America without the payment of any royalty thereon or therefor.

CROSS-REFERENCE

This application is related to a patent application with application Ser. No. 14/868,493, filed on Sep. 29, 2015. This application is also related to a patent application with application Ser. No. 14/868,509, filed on Sep. 29, 2015.

BACKGROUND

In communications, a signal can be transferred from one location to another. This signal can communicate information. In an environment that is complex, this information can be vital for mission success. As the environment becomes more complex, a desire can arise for multiple signals to be transmitted concurrently so more information can be quickly communicated.

SUMMARY

In one embodiment, a system comprises a first transmitter and a second transmitter. The first transmitter can be configured to transmit a first radio beamforming waveform that is a first arbitrary waveform at a first frequency. The second transmitter can be configured to transmit a second radio beamforming waveform that is a second arbitrary waveform at a second frequency, where the first frequency and the second frequency can be different frequencies. The first transmitter can be configured to transmit the first radio beamforming waveform and the second transmitter is configured to transmit the second radio beamforming waveform, at least in part, concurrently.

In one embodiment, a system comprises a first receiver configured to receive a response to a first radio beamforming waveform at a first frequency and a second receiver configured to receive a response to a second radio beamforming waveform at a second frequency. The first frequency can be a first frequency band, the second frequency can be a second frequency band, and the first frequency band and second frequency band can be separate and distinct. A plurality of transmitters can comprise a first transmitter that is configured to transmit the first radio beamforming waveform at the first frequency and a second transmitter that is configured to transmit the second radio beamforming waveform at the second frequency that is different from the first frequency. The first transmitter can be configured to transmit the first radio beamforming waveform and the second transmitter can be configured to transmit the second radio beamforming waveform, at least in part, simultaneously.

In one embodiment, a method is performed, at least in part, by a multiple input-multiple output beamforming system. The method can comprise transmitting, by way of a first transmitter that is part of a plurality of transmitters, a radio beamforming waveform at a first frequency. The method can also comprise transmitting, by way of a second transmitter that is part of the plurality of transmitters, the radio beamforming waveform at a second frequency that is different from the first frequency concurrently with transmitting the radio beamforming waveform at the first frequency. The method can additionally comprise receiving, by way of a first receiver that is part of a plurality of receivers, a response to the radio beamforming waveform that is transmitted at the first frequency. The method can further comprise receiving, by way of a second receiver that is part of the plurality of receivers, a response to the radio beamforming waveform that is transmitted at the second frequency. The first radio beamforming waveform and the second radio beamforming waveform can be a radio beamforming waveform set, where the radio beamforming waveform set is dependent on a frequency shift.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
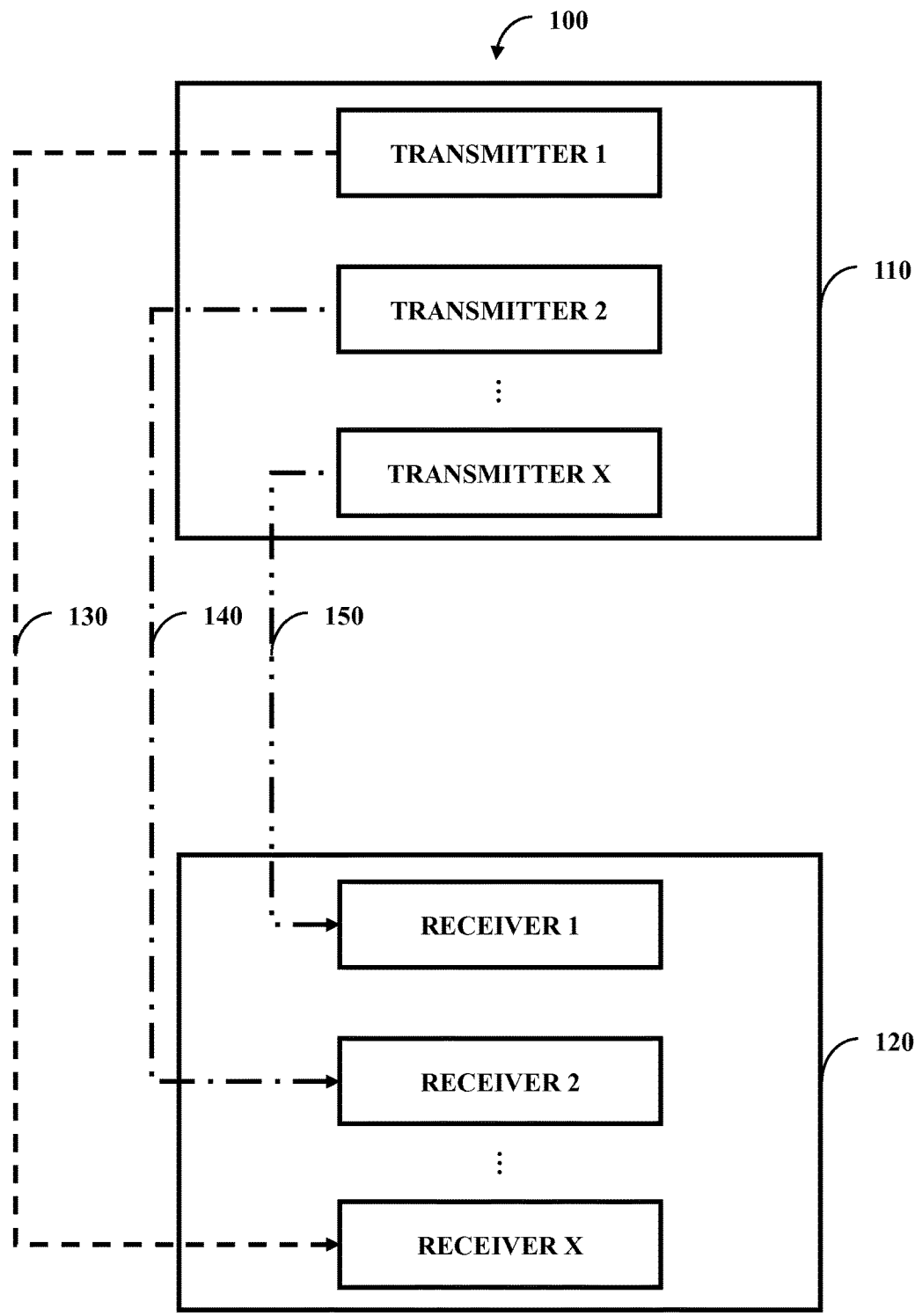
FIG. 1 illustrates one embodiment of a system comprising a plurality of transmitters and a plurality of receivers.

In one embodiment, multiple radio beamforming waveforms can be communicated in a multiple input-multiple output (MIMO) environment. These multiple waveforms can be redundant copies of the same waveforms or be different waveforms. If the multiple waveforms are transmitted concurrently without a shift, then the waveforms may not be clearly communicated. Therefore, multiple waveforms can be transmitted concurrently and these waveforms can be shifted from one another such that clear communication occurs.

Various types of shifts can occur. In one embodiment, shifting can be time based. With time based shifting, signal transmission can be staggered such that the signal does not conflict with itself. In one embodiment, shifting can be frequency based. Different signals with different frequencies can be transmitted simultaneously, and due to these different frequencies, signal confusion can be unlikely to occur. In one embodiment, shifting can be circular based. With circular based shifting, different signals can be moved with relation to time and frequency.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

FIG. 1 illustrates one embodiment of a system 100 comprising a plurality of transmitters 110 and a plurality of receivers 120. The plurality of transmitters 110 comprises two or more transmitters with FIG. 1 illustrating Transmitter 1 that can be considered a first transmitter, Transmitter 2 that can be considered a second transmitter, and Transmitter X with X being a positive integer valued at two or greater. Similar to the plurality of transmitters 110, the plurality of receivers 120 comprises two or more receivers with FIG. 1 illustrating Receiver 1 that can be considered a first receiver, Receiver 2 that can be considered a second receiver, and Receiver X with X being a positive integer.

While the plurality of receivers 120 and the pluralities of transmitters 110 are shown as separate elements, it is to be appreciated that these could be configured as one element. In one example, Transmitter 1 and Receiver 1 can function as one piece of hardware and therefore be co-located. This can be used when Transmitter 2 and Receiver 2 are either one piece of hardware or are separate. For both the plurality of transmitters 110 and the plurality of receivers 120, while it visually appears that there are at least three transmitters and three receivers, the plurality can be implemented with two transmitters and/or two receivers.

The plurality of transmitters 110 can transmit a plurality of waveforms 130, 140, and 150 (waveforms 130-150 can be the same waveforms or different waveforms). After transmission, the plurality of receivers 120 can receive the waveforms 130-150 and/or a response to the waveforms 130-150 (e.g., a reflection of the waveforms 130-150 off a surface). The waveforms 130-150 can be shifted from one another such that clear communication can occur between the plurality of transmitters 110 and the plurality of receivers 120.

In one embodiment, transmitter 1 can be configured to transmit a first radio beamforming waveform (e.g., waveform 130) at a first time ($\tau_1$). Transmitter 2 can be configured to transmit a second radio beamforming waveform (e.g., waveform 140) at a second time ($\tau_2$). The second time has a delay from the first time such that Transmitter 1 is configured to transmit the second radio beamforming waveform after Transmitter 2 transmits the first radio beamforming waveform. The first radio beamforming waveform and the second radio beamforming waveform can be part of a radio beamforming waveform set (e.g., be either the entire waveform set or members with other waveforms in the waveform set).

In one embodiment, transmitter 1 can be configured to transmit the first radio beamforming waveform at a first frequency. Transmitter 2 can be configured to transmit a second radio beamforming waveform at a second frequency (e.g., transmitted, at least in part, concurrently with transmission of the first waveform). The first frequency and the second frequency can be different frequencies and/or be in different frequency bands that are separate and distinct (no overlap of the bands or adjacent overlap such that the end frequency of one band is the start frequency of the next band).

The plurality of receivers 120 can be configured to receive a response to the first radio beamforming waveform and the second radio beamforming waveform. The response, for example, can be the waveform itself, a distorted version of the waveform (e.g., due to interference), or a reflection of the waveform off the surface. The multiple receivers of the plurality of receivers can receive a response from the same waveform.

The plurality of receivers 120 can be configured to receive a response to transmission of the first radio beamforming waveform (e.g., at Receiver 1) and configured to receive a response to transmission of the second radio waveform (e.g., at Receiver 2). The first radio beamforming waveform and the second radio beamforming waveform can be either the same waveform or different waveforms, and/or can be part of the radio beamforming waveform set. When the first and second radio beamforming waveforms are the same signal, they can be transmitted at the same frequency.

In one embodiment, the first transmitter can be configured to transmit the first radio beamforming waveform and the second transmitter can be configured to transmit the second radio beamforming waveform. The first transmitter and the second transmitter can be such that they are non-synchronous to one another with regard to time and frequency. This can be that their respective transmission (e.g., the first and second waveforms respectively) can be non-synchronous to one another with regard to time and frequency. These transmissions can function concurrently (e.g., simultaneously) and/or be in the same frequency band.

Figure 2:
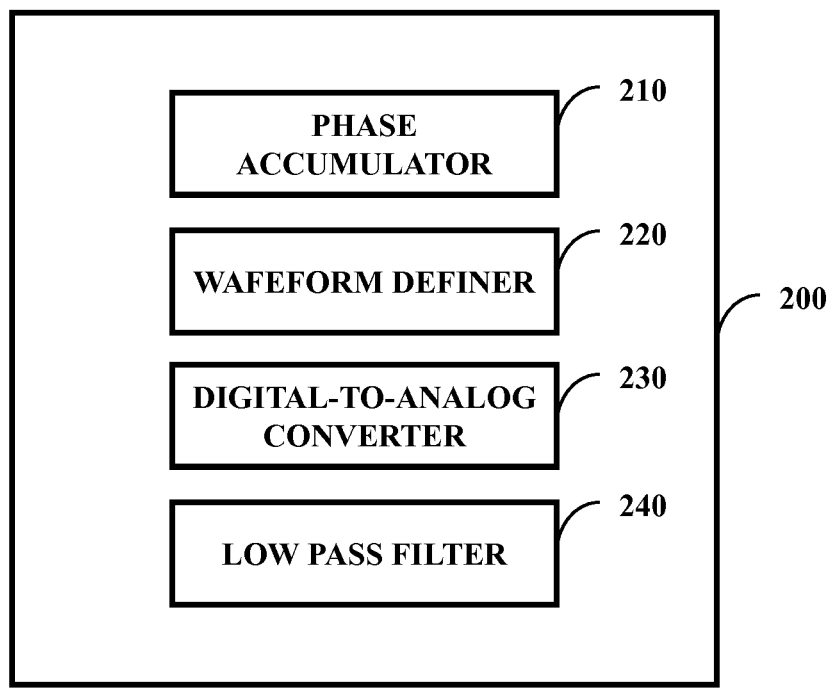
FIG. 2 illustrates one embodiment of a system comprising a phase accumulator, a waveform definer, a digital-to-analog converter, and a low pass filter.

FIG. 2 illustrates one embodiment of a system 200 comprising a phase accumulator 210, a waveform definer 220, a digital-to-analog converter 230, and a low pass filter 240. The system 200 can function as an arbitrary waveform generator and be used in conjunction with the system 100 of FIG. 1 to produce the waveforms 130-150 of FIG. 1. The phase accumulator 210 can produce clocked information and this information can be used by the waveform definer 220. The waveform definer 220 can produce the basis of the waveforms 130-150. This can be done through access of an internal memory bank that retains pre-stored definitions and/or received from an external source, such as a software-controller interface delivering custom-designed definitions. The digital to analog converter 230 can change the output of the waveform definer 220 to analog and this analog waveform can be filtered by the low pass filter 240 and outputted (e.g., transmitted).

Figure 3:
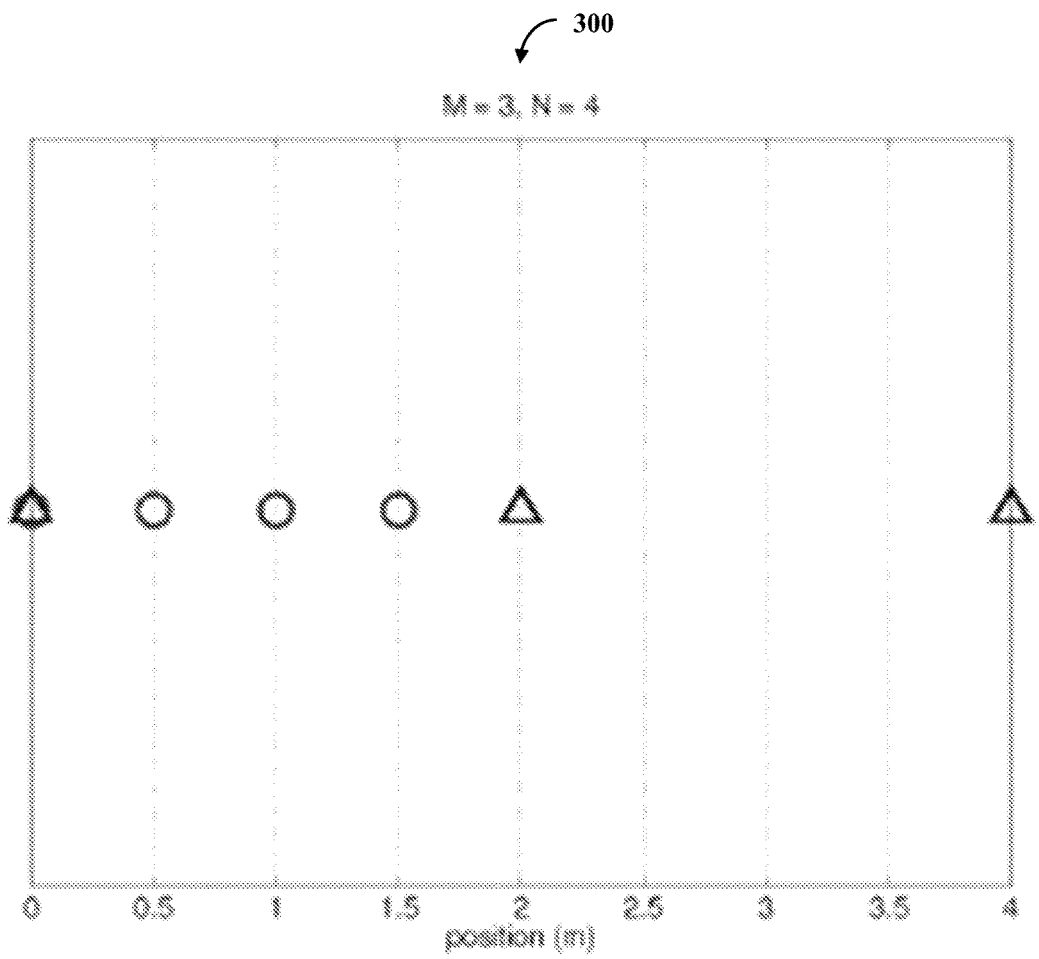
FIG. 3 illustrates one embodiment of a layout of a multiple input-multiple output system.

FIG. 3 illustrates one embodiment of a layout 300 of a MIMO system. The layout 300 is for a wavelength of 1 meter and illustrates a physical configuration for the plurality of transmitters 110 of FIG. 1 and the plurality of receivers 120 of FIG. 1. Individual transmitters are triangles while individual receivers are circles. At position 0, both a transmitter and receiver are illustrated. This can be that the transmitter and receiver are co-located (e.g., next to one another) or that one device functions as a transmitter and a receiver, and thus is part of both pluralities 110 and 120.

The MIMO system can comprise the plurality of transmitters 110 of FIG. 1 and the plurality of receivers 120 of FIG. 1. The MIMO system (otherwise known as MIMO array) can transmit waveforms across a real array such that low correlation exists between transmitted signals (e.g., waveforms 130-150 of FIG. 1) in the waveform vector $s(t) \triangleq [s_0(t), \ldots, s_{M-1}(t)]$. Conditions for orthogonality can satisfy the following: $\int_\tau s(t) s^H(t) dt = I_M$, where $\tau$ is the pulse duration, t is the time index, $I_M$ is the M×M identity matrix, and $(\bullet)^H$ is the Hermitian transpose. Thus, convolution of the M sub-arrays can yield an increase in available degrees of freedom, as well as an increase in spatial resolution. Orthogonality can be ensured in various manners, such as in time, in frequency, or in some combination thereof.

Figure 4:
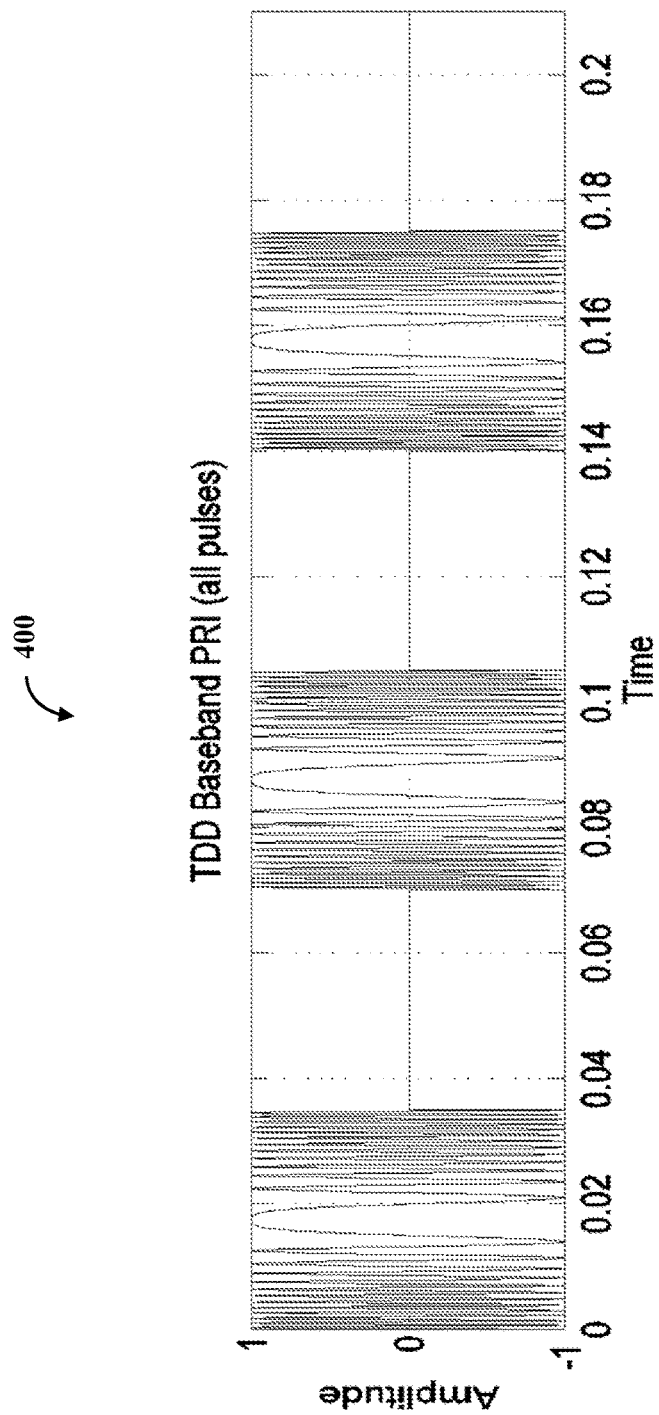
FIG. 4 illustrates one embodiment of a graph.

FIG. 4 illustrates one embodiment of a graph 400. The graph 400 illustrates how to implement time-division duplex pulse-compressed MIMO radar waveforms. The graph 400 shows that orthogonality can be achieved through time. With this, the same waveform can be sent out three times (e.g., waveforms 130-150 are the same waveform). Transmission of the waveforms can be staggered such that a second waveform is not transmitted until after transmission of a first waveform is complete.

Ensuring orthogonality in the time domain can mean that only one transmitter in the MIMO array can be active at a time (active in transmission). That is, the transmitter firing sequence for a MIMO waveform construct can have intermittent delays across transmitters equal to at least one pulse repetition interval (PRI). The time-division duplex MIMO transmit waveform can be designed as:

$$s_m(t) = \Sigma_{l=0}^{L-1} u[t-(Ml+m)T_0] \exp\{j\pi\mu t^2\}, m=0 \ldots M-1 \quad (1)$$

where M is the number of transmitters that are part of the plurality of transmitters 110 of FIG. 1, L is the number of pulses, $T_0$ is the PRI, and $\mu$ is the linear frequency modulated (LFM) chirp rate. In view of this, the members of the radio beamforming waveform set can be dependent on the PRI, the chirp rate (LFM chirp rate), pulse number, number of transmitters, or a combination thereof. By inspection of (1), the plurality of transmitters 110 of FIG. 1 can transmit a pulse every $MT_0$ seconds. During a signal processing stage, channelization of the M×N MIMO array (N being number of receivers in the plurality of receivers 120 of FIG. 1) can be streamlined to the equivalent of a uniform linear array (ULA) that can be in one example 1×MN since a matched filter (e.g., used in digital signal processing) can be identical for transmitted signals.

Figure 5:
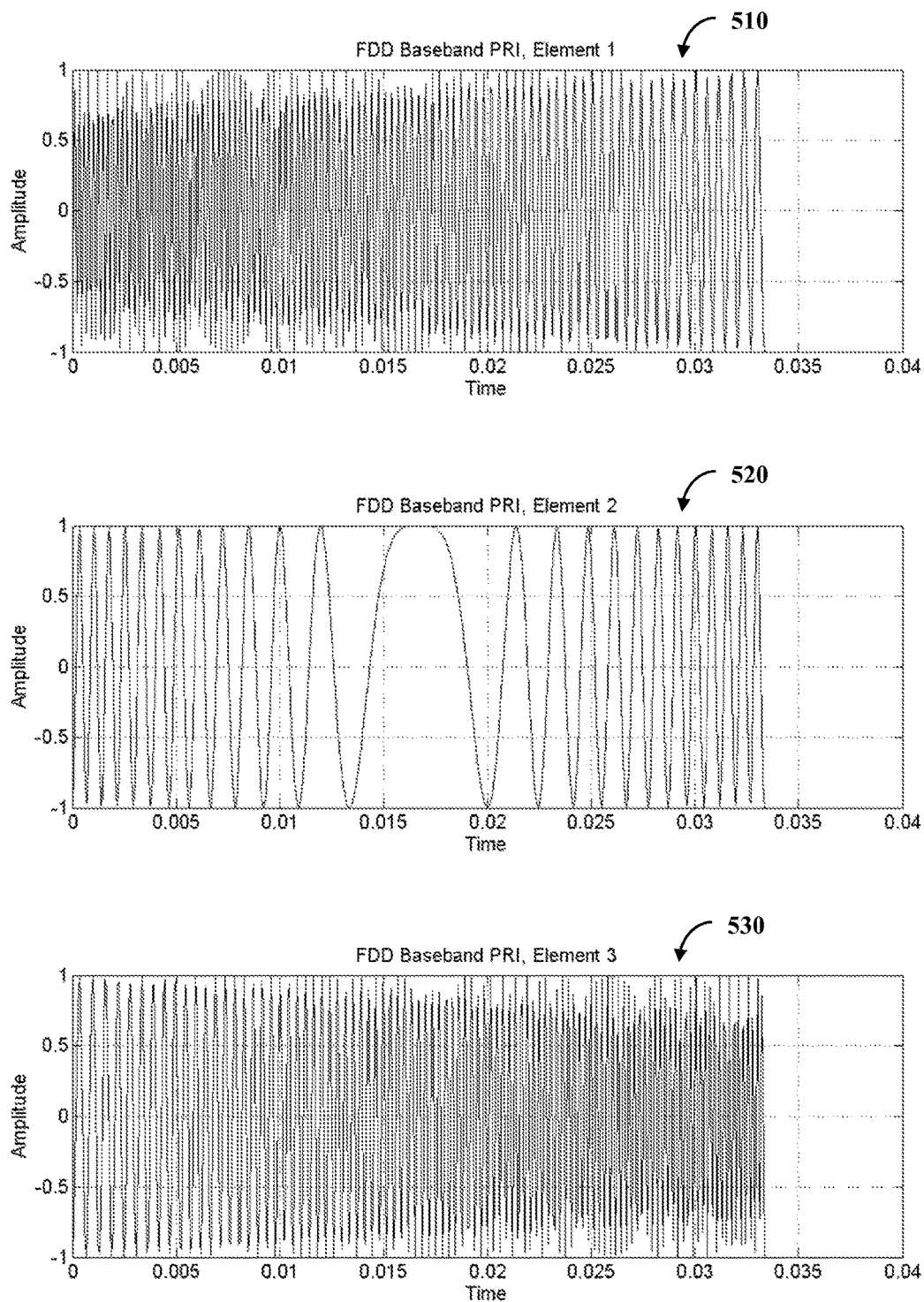
FIG. 5 illustrates one embodiment of three graphs.
Figure 6A:
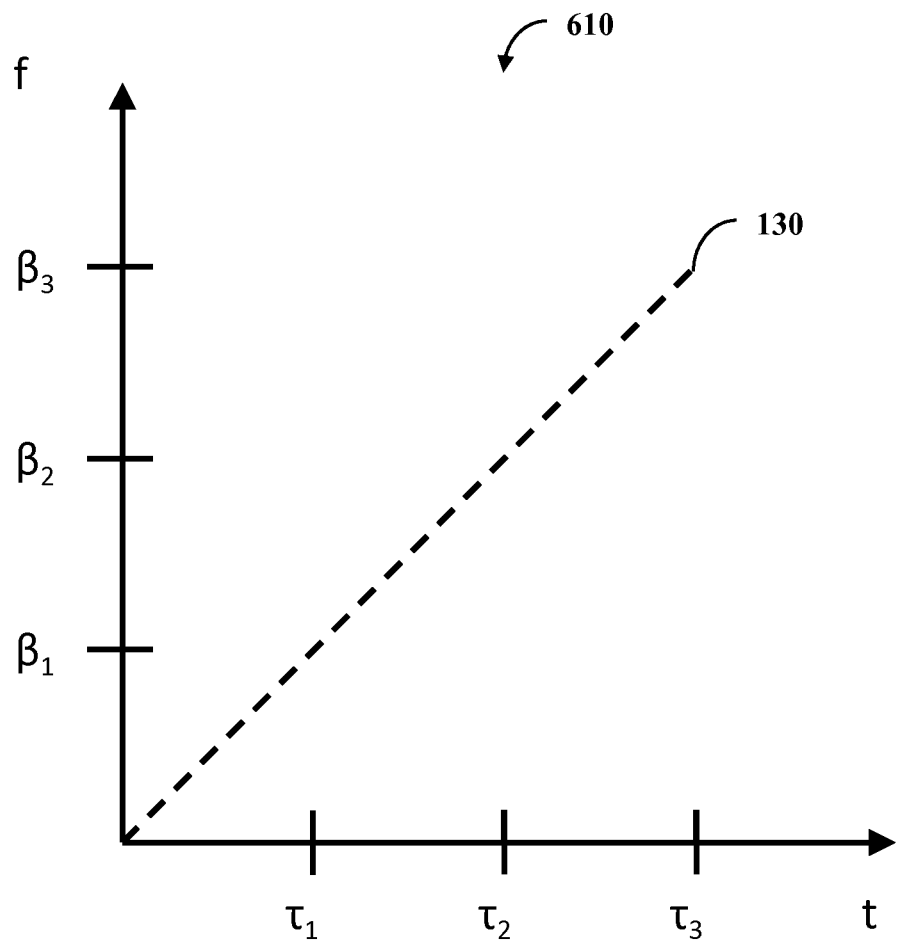
FIGS. 6a-6d illustrate the time vs. frequency of three waveforms—one graph for each waveform individually and one graph showing all three waveforms.
Figure 6B:
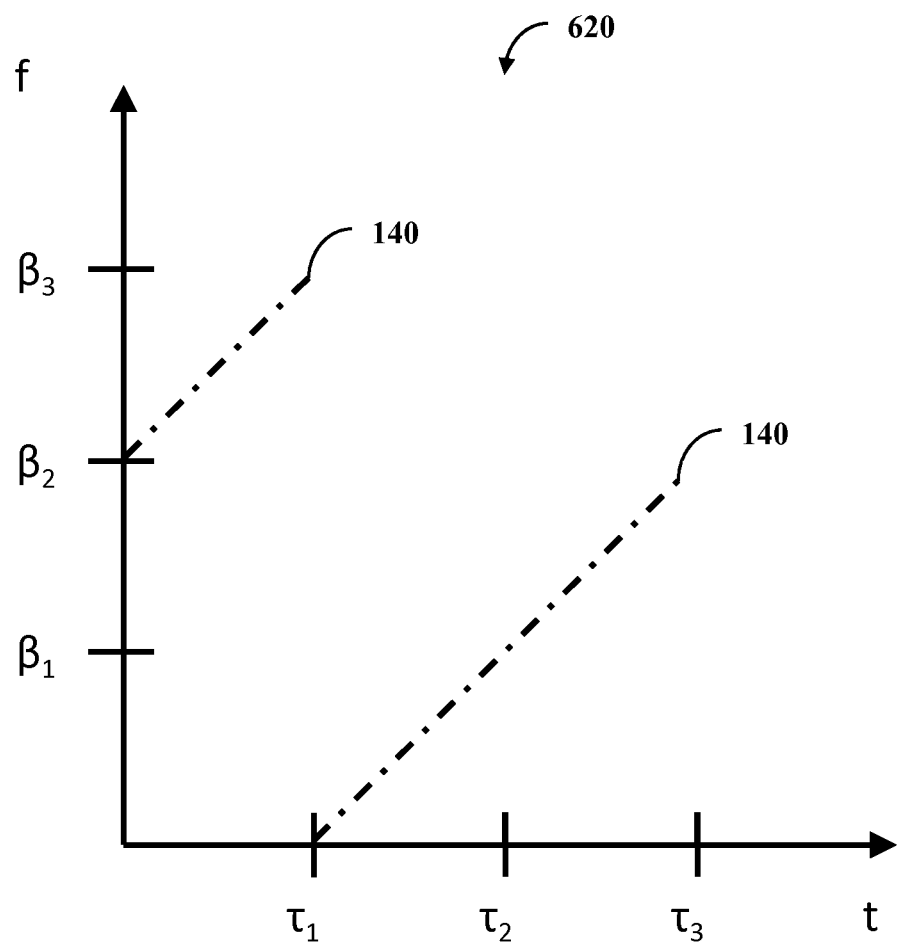
Figure 6C:
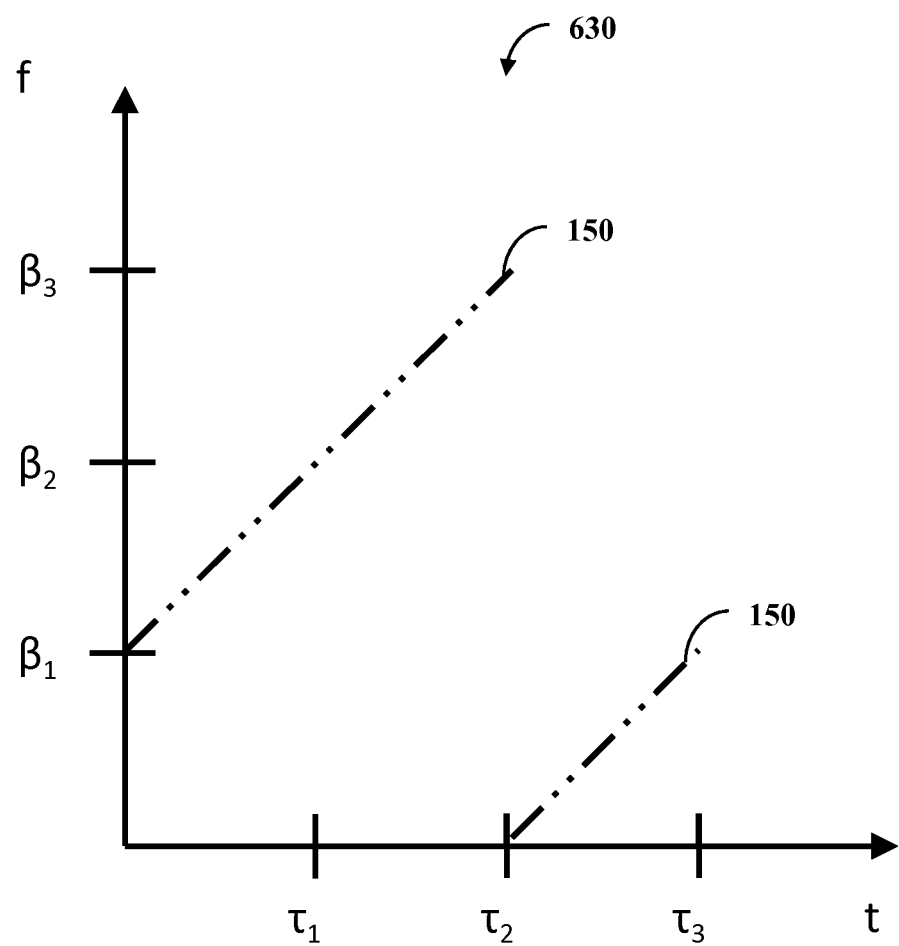
Figure 6D:
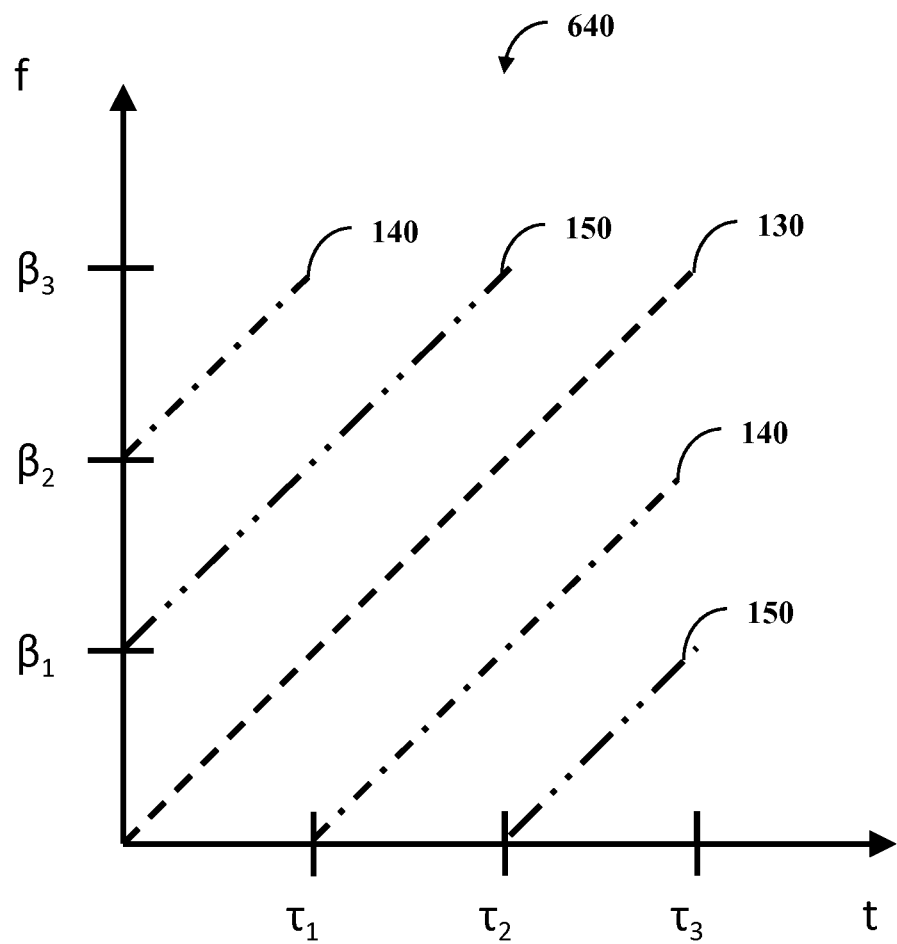

FIG. 5 illustrates one embodiment of three graphs 510-530. The three graphs 510-530 illustrate how to implement frequency-division duplex pulse-compressed MIMO radar waveforms. Orthogonalitiy in the frequency domain can function to not constrain an active state of the MIMO array, and therefore, the individual transmitters can operate simultaneously; however, orthogonality, along with unambiguity, in the frequency-domain can be ensured if the waveforms 130-150 of FIG. 1 are separated by a frequency deviation equal to at least the swept bandwidth, $\beta$. As a result, a total frequency deviation can depend on the number of transmitters in the MIMO array. These transmitters can span an operational bandwidth of $M\beta$. The frequency-division duplex MIMO transmit waveform can be designed as $$s_m(t) = \Sigma_{l=0}^{L-1} u[t-lT_0] \exp\{j\pi(2m\Delta(1-\varepsilon)t + \mu t^2)\},$$
$$m=0 \ldots M-1 \quad (2)$$

where M is the number of individual transmitters, L is the number of pulses, $T_0$ is the PRI, $\Delta f$ is the frequency shift, $\varepsilon$ is the frequency offset used to control the amount of spectrum overlap in the transmitted signals (e.g., $\varepsilon=0.5$ is 50% overlap), and $\mu$ is the LFM chirp rate. In view of this, the radio beamforming waveform set can be dependent on PM, frequency shift, frequency offset, number of pulses, the number of transmitters in the plurality of transmitters 110 of FIG. 1, or a combination thereof.

The individual transmitters, in one example designated as element 1, element 2, and element 3, can transmit the waveforms 130-150 of FIG. 1 at different frequencies. By inspection of equation (2), the individual transmitters transmit pulses simultaneously, however, each pulse is swept over a frequency deviation of [m $\Delta f(1-\varepsilon)+\mu t$] Hz. During a signal processing stage, the channelization of the M×N MIMO array can be partitioned into M channels each having a matched filter that corresponds to the $m^{th}$ transmit signal.

FIGS. 6a-6d illustrate the time vs. frequency of the three waveforms 130-150—one graph for each waveform individually (graphs 610-630) and one graph 640 showing all three waveforms. As graph 640 illustrates, the waveforms can be communicated simultaneously, occupying different bandwidths (or within distinct bandwidth ranges) at the same time. At time (t) of $\tau_1$, the first waveform 130 is at a frequency (f) of $\beta_1$, the second waveform 140 is at a frequency (f) of $\beta_3$ and the third waveform 150 is at a frequency (f) of $\beta_2$. Therefore, at the same time the waveforms 130-150 can be at different frequencies. At time of $\tau_2$ the first waveform 130 is at a frequency (f) of $\beta_2$ while the second waveform 140 is at a frequency (f) of $\beta_1$ and the third waveform 150 is at a frequency (f) of $\beta_3$. Therefore, the waveforms 130-150 can occupy the same frequency, but at different times.

By encoding a waveform (e.g., radar waveform) using a combination of time-division duplex pulse-compressed and frequency-division duplex pulse-compressed techniques (the combination can be considered a circular-shifted duplex pulse-compressed technique), orthogonality can be achieved in an efficient manner. That is, the MIMO system (e.g., MIMO radar system) can function without staggering a transmitter firing sequence, as is done with time-division duplex pulse compression, and the MIMO system can function without the need to span a large operational bandwidth as is done with frequency-division duplex pulse compression. By circular-shifting, the individual transmitters of the plurality of transmitters 110 of FIG. 1 are able to fire simultaneously while operating over one instantiation of swept bandwidth, β. The circular-shifted duplex MIMO transmit waveform can be designed as:

$$s_m(t)=\sum_{l=0}^{L-1}a[t-lT_0], m=0\ldots M-1 \quad (3)$$

where $$a(t)=\sum_{m=0}^{M-1}\sum_{z=0}^{Z-1}u[t-zT_b]\exp\{j\pi(2\delta_{m,z}t+\mu t^2)\} \quad (4)$$

and where M is the number of transmit elements, L is the number of pulses, Z is the number of sub-pulses, $T_0$ is the PRI, $T_b=\tau/Z$ is the sub-pulse defined as a function of the total pulse duration τ, $\delta_{m,z}=\Delta f\{(z-m)\bmod z\}$ is the sub-carrier frequency step (mod Z) defined as a function of $\Delta f=\beta/Z$, and μ is the LFM chirp rate. Therefore, the radio beamforming waveform set can be dependent on the number of sub-pulses, the sub-pulse duration, and the number of sub-carriers, the sub-carrier frequency step, PRI, the number of pulses, the chirp rate, or a combination thereof. During signal processing stages, channelization of the M×N circular-shifted MIMO can be partitioned into M channels, which each have a matched filter that corresponds to the transmit signals.

Figure 7:
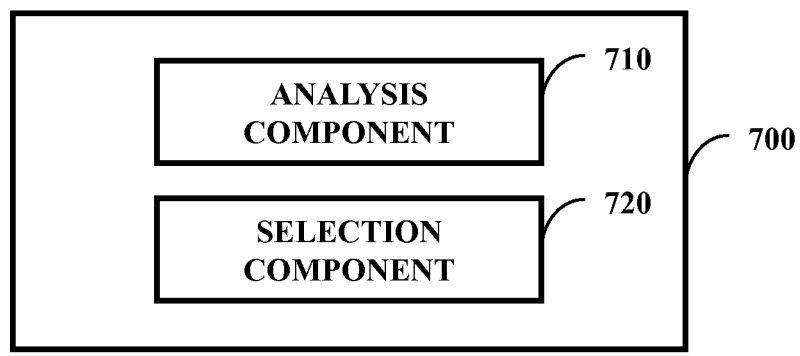
FIG. 7 illustrates one embodiment of a system comprising an analysis component and a selection component.

FIG. 7 illustrates one embodiment of a system 700 comprising an analysis component 710 and a selection component 720. The analysis component 710 can perform an analysis on a situation to produce an analysis result. Based, at least in part, on the analysis result, the selection component 720 can select a pulse compression technique to use.

In one example, the analysis component 710 can analyze waveforms for transmission. The result from this analysis can be that the waveforms are identical. The selection component 720 can determine that time-division duplex pulse compression is appropriate.

In another example, the analysis component 710 can analyze waveforms for transmission. The result from this analysis can be that the waveforms are not identical. The selection component 720 can determine that either the circular-shifted duplex pulse compressed technique or the frequency-shifted duplex pulse compressed technique is appropriate. The selection component 720 can select one of these two techniques, such as through determining an available frequency band and subsequently basing this decision depending on the available frequency band.

Figure 8:
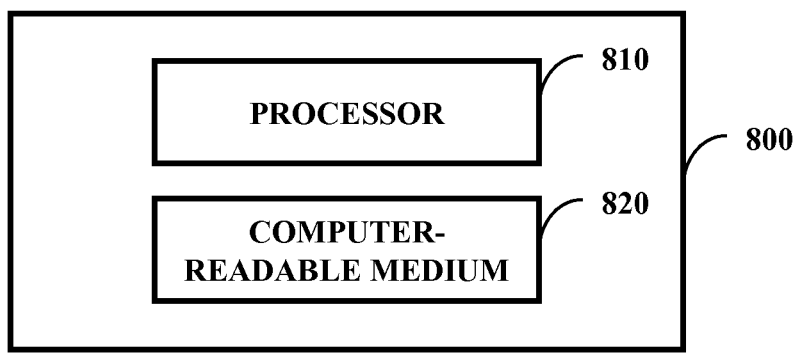
FIG. 8 illustrates one embodiment of a system comprising a processor and a computer-readable medium.

FIG. 8 illustrates one embodiment of a system 800 comprising a processor 810 (e.g., a general purpose processor or a processor specifically designed for performing functionality disclosed herein) and a computer-readable medium 820 (e.g., non-transitory computer-readable medium). In one embodiment, the processor 810 is a pulse compression processor configured to process the first and second radio beamforming waveforms through pulse compression. In one embodiment, the computer-readable medium 820 is communicatively coupled to the processor 810 and stores a command set executable by the processor 810 to facilitate operation of at least one component disclosed herein (e.g., the analysis component 710 of FIG. 7 or a selection component configured to select the delay). In one embodiment, at least one component disclosed herein (e.g., the selection component 720 of FIG. 7) can be implemented, at least in part, by way of non-software, such as implemented as hardware by way of the system 800. In one embodiment, the computer-readable medium 820 is configured to store processor-executable instructions that, when executed by the processor 810, cause the processor 810 to perform a method disclosed herein (e.g., the methods 900-1000 addressed below).

Figure 9:
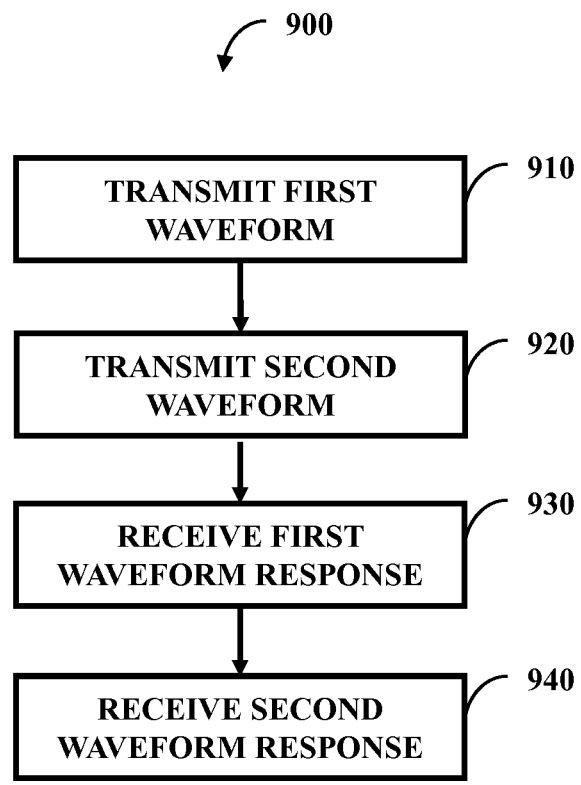
FIG. 9 illustrates one embodiment of a method comprising four actions.

FIG. 9 illustrates one embodiment of a method 900 comprising four actions 910-940. At 910, transmitting a first radio beamforming waveform at a first time can occur. This can be done by way of the first transmitter, which is part of the plurality of transmitters 110 of FIG. 1. At 920, transmitting a second radio beamforming waveform can occur. This transmission can occur either at the first time or at a second time after transmission of the first radio beamforming waveform at the first time at 910. Also, this transmission can be done by way of the second transmitter that is part of the plurality of transmitters 110 of FIG. 1. The first radio beamforming waveform and the second radio beamforming waveform can be either at the same frequency or different frequencies. At 930, receiving a response to the first radio beamforming waveform can take place, and at 940, receiving a response to the second radio beamforming waveform can take place. These two receptions can be performed by receivers of the plurality of receivers 120 of FIG. 1.

Figure 10:
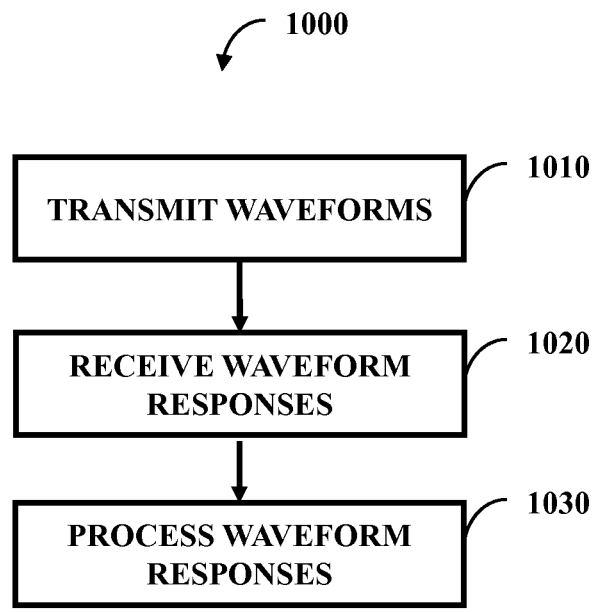
FIG. 10 illustrates one embodiment of a method comprising three actions.

FIG. 10 illustrates one embodiment of a method 1000 comprising three actions 1010-1030. At 1010, transmitting a first radio beamforming waveform can occur. This can be by way of a first transmitter that is part of the plurality of transmitters 110 of FIG. 1. Also at 1010, transmitting a second radio beamforming waveform can occur. This can be by way of a first transmitter that is part of the plurality of transmitters 110 of FIG. 1. At 1020, receiving a response to the first radio beamforming waveform, which is transmitted by way of the first transmitter, can occur. This can be done by way of a first receiver that is part of the plurality of receivers 120 of FIG. 1. Also at 1020, receiving a response to the second radio beamforming waveform, which is transmitted by way of the first transmitter, can occur. This can be done by way of a second receiver that is part of the plurality of receivers 120 of FIG. 1. At 1030, processing the response to the first radio beamforming waveform can occur by way of channelization of the first radio beamforming waveform through partitioning of the first radio beamforming waveform into a number of channels that is at least equal to a number of transmitters in the plurality of transmitters. Also at 1030, processing the response to the second radio beamforming waveform can occur by way of channelization of the second radio beamforming waveform through partitioning of the second radio beamforming waveform into a number of channels that is at least equal to a number of transmitters in the plurality of transmitters 110 of FIG. 1. This aforementioned processing can be performed by the processor 810 of FIG. 8.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A system, comprising:
    a first transmitter configured to transmit a first radio beamforming waveform within a first frequency band over a period and with a frequency varying within the first frequency band over at least part of the period; and
    a second transmitter configured to transmit a second radio beamforming waveform within a second frequency band over the period with a frequency varying within the second frequency band over at least part of the period, where the first frequency band and the second frequency band are separate and distinct and where the first transmitter is configured to transmit the first radio beamforming waveform and the second transmitter is configured to transmit the second radio beamforming waveform, at least in part, concurrently.

2. The system of claim 1,
where the first radio beamforming waveform and the second radio beamforming waveform are a radio beamforming waveform set and
where the radio beamforming waveform set is dependent on a number of pulses.

3. The system of claim 1,
where the first radio beamforming waveform and the second radio beamforming waveform are a radio beamforming waveform set and
where the radio beamforming waveform set is dependent on a pulse repetition interval.

4. The system of claim 1,
where the first radio beamforming waveform and the second radio beamforming waveform are a radio beamforming waveform set and
where the radio beamforming waveform set is dependent on a frequency shift.

5. The system of claim 1,
where the first radio beamforming waveform and the second radio beamforming waveform are a radio beamforming waveform set and
where the radio beamforming waveform set is dependent on a frequency offset.

6. A non-transitory computer-readable medium configured to store processor-executable instructions that, when executed by a processor, cause the processor to perform a method, the method comprising:
causing a first transmitter to transmit a first radio beamforming waveform within a first frequency band over a period and with a frequency value of the first radio beamforming waveform varying within the first frequency band over at least part of the period; and
causing a second transmitter, at least in part concurrently with the first transmitter transmitting, to transmit a second radio beamforming waveform within a second frequency band over the period and with a frequency value of the second radio beamforming waveform varying within the second frequency band over at least part of the period,
where the first frequency band and second frequency band are separate and distinct.

7. The non-transitory computer-readable medium of claim 6, the method further comprising:
where the first radio beamforming waveform and the second radio beamforming waveform are a radio beamforming waveform set and
where the radio beamforming waveform set is dependent on a number of pulses.

8. The non-transitory computer-readable medium of claim 6, the method further comprising:
where the first radio beamforming waveform and the second radio beamforming waveform are a radio beamforming waveform set and
where the radio beamforming waveform set is dependent on a pulse repetition interval.

9. The non-transitory computer-readable medium of claim 6, the method further comprising:
where the first radio beamforming waveform and the second radio beamforming waveform are a radio beamforming waveform set and
where the radio beamforming waveform set is dependent on a frequency shift.

10. The non-transitory computer-readable medium of claim 6, the method further comprising:
where the first radio beamforming waveform and the second radio beamforming waveform are a radio beamforming waveform set and
where the radio beamforming waveform set is dependent on a frequency offset.

11. The non-transitory computer-readable medium of claim 6, the method further comprising:
where the first transmitter and the second transmitter are part of a transmitter set,
where the first radio beamforming waveform and the second radio beamforming waveform are a radio beamforming waveform set and
where the radio beamforming waveform set is dependent on a number of transmitters in the transmitter set.

12. The non-transitory computer-readable medium of claim 6, the method further comprising:
where the first radio beamforming waveform and the second radio beamforming waveform are a radio beamforming waveform set and
where the radio beamforming waveform set is dependent on a chirp rate.

13. A method performed, at least in part, by a multiple input-multiple output signal system, the method comprising:
transmitting a first signal within a first frequency band over a period and with a frequency value varying within the first frequency band over at least part of the period;
transmitting a second signal within a second frequency band over the period, with a frequency value varying within the second frequency band over at least part of the period, and concurrently with transmitting the first signal within the first frequency band; where the first frequency band and second frequency band are separate and distinct;
where the first signal and the second signal are a signal set and
where the signal set is dependent on a frequency shift.

14. The method of claim 13, where the signal set is dependent on a number of pulses.

15. The method of claim 14, where the signal set is dependent on a pulse repetition interval.

16. The method of claim 15, where the signal set is dependent on a frequency offset.

17. The method of claim 16, where the signal set is dependent on a number of transmitters in the plurality of transmitters.

18. The method of claim 13, comprising:
receiving a response to the transmission of the first signal; and
receiving a response to the transmission of the second signal.

* * * * *